(12) United States Patent
Graham et al.

(10) Patent No.: US 11,041,446 B2
(45) Date of Patent: Jun. 22, 2021

(54) GAS TURBINE ENGINE FUEL ADDITIVE CONTROL SYSTEM

(71) Applicants: Rolls-Royce Corporation, Indianapolis, IN (US); Rolls-Royce North American Technologies Inc., Indianapolis, IN (US)

(72) Inventors: Kenneth L. Graham, Indianapolis, IN (US); John Joseph Costello, Indianapolis, IN (US); Richard Joseph Skertic, Carmel, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 215 days.

(21) Appl. No.: 16/014,661

(22) Filed: Jun. 21, 2018

(65) Prior Publication Data
US 2019/0264619 A1 Aug. 29, 2019

Related U.S. Application Data

(60) Provisional application No. 62/634,611, filed on Feb. 23, 2018.

(51) Int. Cl.
*F02C 9/26* (2006.01)
*F02C 9/28* (2006.01)
(Continued)

(52) U.S. Cl.
CPC ............. *F02C 9/28* (2013.01); *F02C 7/232* (2013.01); *F02C 9/26* (2013.01); *F02C 9/40* (2013.01); *F05D 2270/13* (2013.01)

(58) Field of Classification Search
CPC .... F02C 9/26; F02C 9/263; F02C 9/28; F02C 9/40; F02C 9/42; F02C 7/22; F02C 7/232;
(Continued)

(56) References Cited

U.S. PATENT DOCUMENTS

| | | | |
|---|---|---|---|
| 5,937,634 A | 8/1999 | Etheridge et al. | |
| 2003/0159427 A1* | 8/2003 | Vickery | F02K 1/17 60/204 |

(Continued)

FOREIGN PATENT DOCUMENTS

| | | |
|---|---|---|
| EP | 2 236 774 A2 | 10/2010 |
| WO | WO 2005/023965 A1 | 3/2005 |
| WO | WO 2014/017185 A1 | 1/2014 |

*Primary Examiner* — William H Rodriguez
(74) *Attorney, Agent, or Firm* — Brinks Gilson & Lione

(57) ABSTRACT

A gas turbine engine fuel additive control system includes a sensor positioned to sense an operational parameter of a gas turbine engine that includes a compressor section, a combustion section, and a turbine section. The system also includes a control valve positioned to supply a fuel additive to a fuel line. The fuel line contains fuel for supply to the combustion section of the gas turbine engine to which the fuel additive is selectively added by injection into the fuel line. The system also includes a controller configured to monitor the operational parameter in real time during operation of the gas turbine engine and adjust the control valve to dynamically modulate an amount of the fuel additive being supplied in the fuel in accordance with operation of the gas turbine engine.

21 Claims, 7 Drawing Sheets

(51) Int. Cl.
*F02C 9/40* (2006.01)
*F02C 7/232* (2006.01)

(58) Field of Classification Search
CPC ........... F05D 2270/301; F05D 2270/13; F05D 2270/71; F05D 2270/08; F05D 2270/303; F05D 2220/323
See application file for complete search history.

(56) References Cited

U.S. PATENT DOCUMENTS

| | | | |
|---|---|---|---|
| 2003/0217554 A1* | 11/2003 | Gadde | F02C 9/28 60/776 |
| 2004/0055273 A1* | 3/2004 | Hirayama | F02C 9/54 60/39.281 |
| 2008/0178600 A1* | 7/2008 | Healy | F02C 9/00 60/773 |
| 2009/0138170 A1* | 5/2009 | Nemet | F02C 7/1435 701/100 |
| 2010/0242490 A1* | 9/2010 | Symonds | F02C 3/305 60/775 |
| 2011/0126545 A1* | 6/2011 | Loeven, II | F23R 3/36 60/772 |
| 2011/0314833 A1 | 12/2011 | Symonds | |
| 2012/0304535 A1* | 12/2012 | Bai | C10L 5/406 44/589 |
| 2013/0074515 A1 | 3/2013 | Widener | |
| 2014/0018973 A1* | 1/2014 | Drohan | G05D 21/02 700/300 |
| 2014/0123654 A1* | 5/2014 | Kemmerer | F02C 7/232 60/741 |
| 2014/0157785 A1* | 6/2014 | Bathina | F23N 1/002 60/772 |
| 2014/0157787 A1* | 6/2014 | Bathina | F02C 7/22 60/776 |
| 2014/0157788 A1* | 6/2014 | Bathina | F02C 9/40 60/776 |
| 2015/0020530 A1 | 1/2015 | Pandey et al. | |
| 2015/0152791 A1* | 6/2015 | White | F02C 9/26 60/773 |
| 2016/0146118 A1* | 5/2016 | Wichmann | F02C 9/50 701/100 |
| 2016/0281607 A1* | 9/2016 | Asati | F02C 6/18 |
| 2016/0305344 A1* | 10/2016 | Morgan | F02C 9/28 |
| 2016/0333731 A1* | 11/2016 | Zhang | F02C 9/28 |
| 2017/0022846 A1* | 1/2017 | Rao | F02C 6/18 |
| 2017/0030228 A1* | 2/2017 | Jordan, Jr. | F01K 23/101 |
| 2017/0175651 A1* | 6/2017 | Davis, Jr. | G05B 15/02 |
| 2018/0283288 A1* | 10/2018 | Ishii | F02C 7/228 |
| 2019/0063328 A1* | 2/2019 | Keeney | F23R 3/36 |
| 2019/0063334 A1* | 2/2019 | Graham | F02C 9/28 |
| 2019/0309689 A1* | 10/2019 | Meisner | F02C 9/56 |

* cited by examiner

GAS TURBINE ENGINE FUEL ADDITIVE CONTROL SYSTEM

CROSS REFERENCE TO RELATED APPLICATIONS

This application claims priority under 35 USC § 119(e) to U.S. provisional application 62/634,611, "GAS TURBINE ENGINE FUEL ADDITIVE CONTROL SYSTEM" filed Feb. 23, 2018, which is incorporated herein by reference in its entirety.

TECHNICAL FIELD

This disclosure relates to gas turbine engines and, in particular, to a gas turbine engine fuel additive control system.

BACKGROUND

Gas turbine engines may include a compressor, a combustor and a turbine. Typically, the compressor is an air compressor rotating on a shaft of the engine to provide air for the combustion cycle. The compressor in a gas turbine engine may be an axial compressor, a centrifugal compressor or a mixed flow compressor. The compressor may include one or more stages and may include rotating blades and stationary vanes. Air compressed by the compressor is provided to the combustor where it is mixed with fuel that is burned. The exhaust gases from the combustor may be provided to the turbine. The turbine may include one or more stages with blades upon which the exhaust gases act to produce thrust. Thus, the turbine extracts energy from the flow of exhaust gases and converts the energy to work, such as rotational energy.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a gas turbine engine fuel additive control system may operate to sense an operational parameter of a gas turbine engine. The system may monitor the sensed operational parameter with a controller and supply fuel to a combustor of the gas turbine engine. The system may also dynamically inject a varying amount of a fuel additive into the fuel in response to real-time changes in the operational parameter such that a combination of the fuel and the fuel additive are supplied to the combustor and dynamically adjust the real-time parameter.

One interesting feature of the systems and methods described below may be that the fuel additive is dynamically added in real-time to the fuel to control one or more operational parameters of the gas turbine engine that are responsive to variable amounts of fuel additive being included in the fuel. For example, an operational parameter related to exhaust gases of the gas turbine engine may be monitored and controlled by injection of different amounts of fuel additive into the fuel line.

Alternatively, or in addition, an interesting feature of the systems and methods described below may be that multiple different fuel additives may be dynamically injected in series or in parallel into the fuel supplied to the gas turbine engine to adjust operational parameters of the gas turbine, such as exhaust gas parameters, temperature parameters and pressure parameters.

Alternatively, or in addition, an interesting feature of the systems and methods described below may be that one or more fuel additives may be dynamically injected during different stages of operation of the gas turbine engine to obtain different or the same objectives. For example, an fuel additive may be injected during heavy loading to decrease operating temperatures or pressures, and a different fuel additive may be dynamically injected in variable amounts during light loading to minimize emissions of exhaust gas components.

Figure 1:
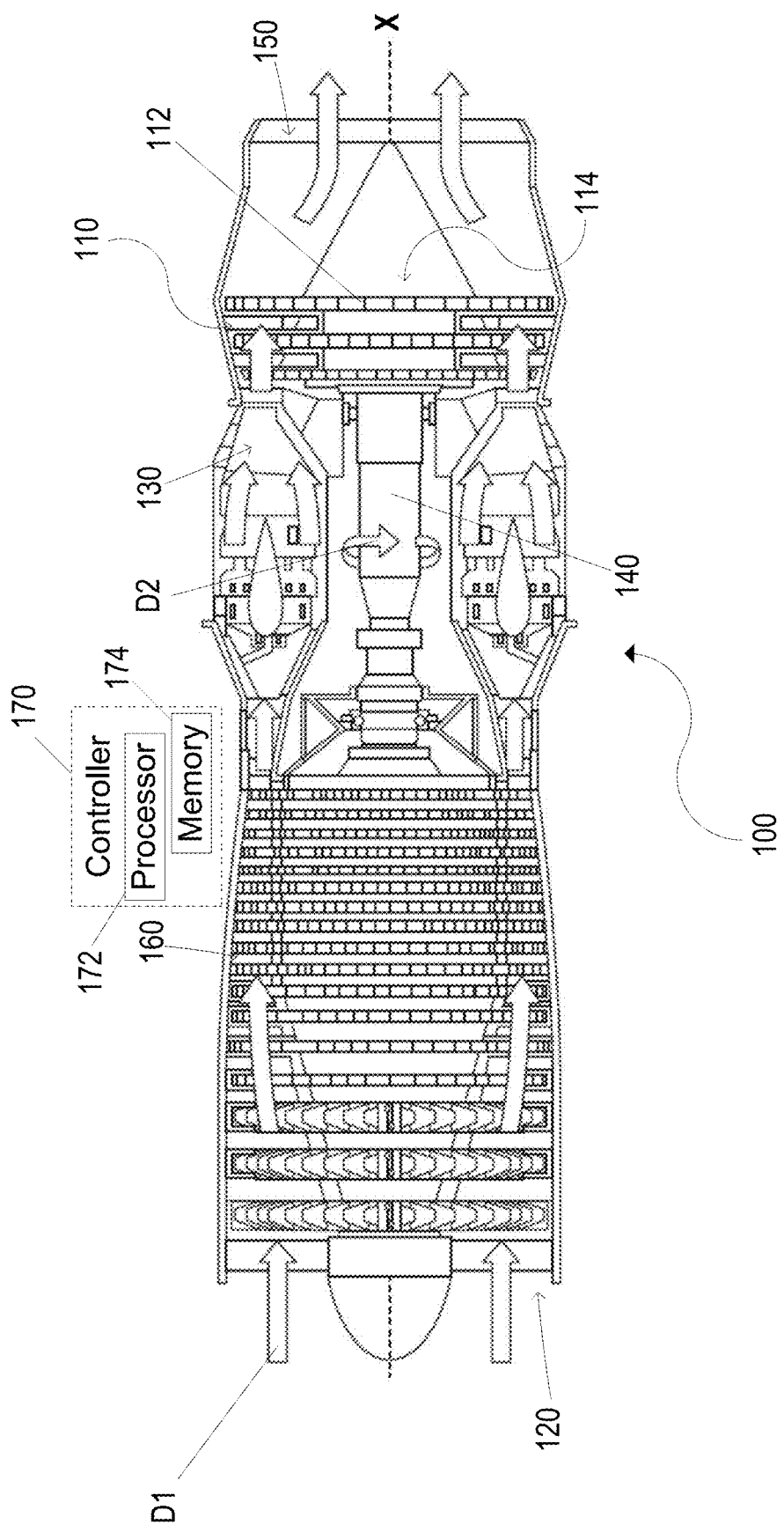
FIG. 1 illustrates a cross-sectional view of an example of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

Operation of the gas turbine engine 100 may be controlled with one or more controllers 170, such as electronic control units (ECU), and/or full authority digital engine control (FADEC) units. The controller 170 may include one or more microprocessors 172 and memory 174. The controller 170 may receive input parameters, such as operational parameters sensed by sensors included in the compressor section 160, the combustion section 130, the turbine section 110, and/or the exhaust section 150 on the gas turbine engine 100. Operational parameters received by the controller 170 may also include operational inputs from other controllers and devices present in the gas turbine engine 100, such as engine speed, vane tip clearance and the like. In addition, the controller 170 may output control signals to the gas turbine engine 100 and other devices.

Figure 2:
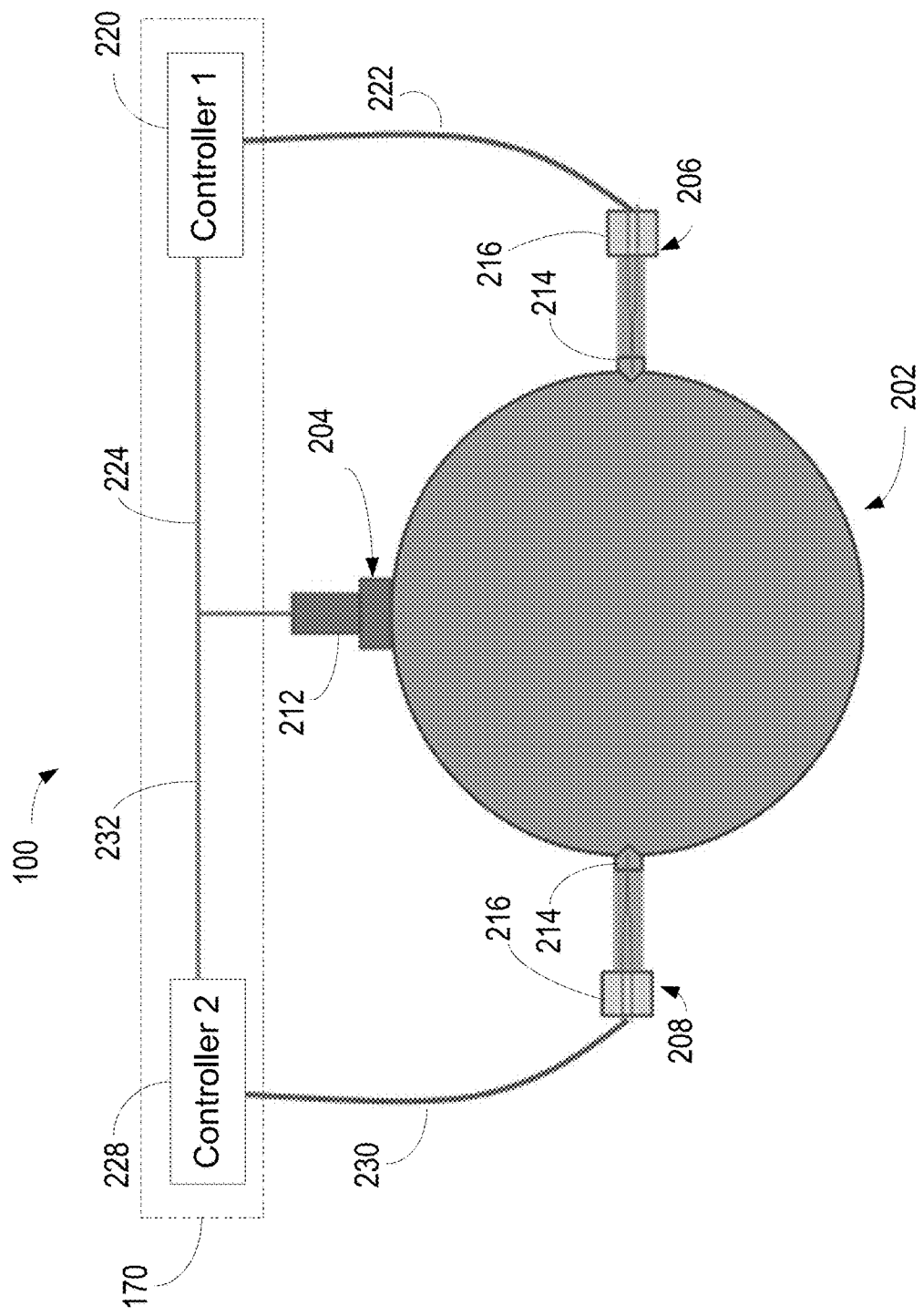
FIG. 2 is a block diagram illustrating an example of temperature and pressure measurements in a combustor section of a gas turbine engine.

FIG. 2 is an example block diagram illustrating temperature and pressure measurements in a combustion section of a gas turbine engine 100. In the example of FIG. 2, a combustor 202 included in the combustion section 130 (FIG. 1) is illustrated as having a pressure sensor 204, a first temperature sensor 206, and a second temperature sensor 208 positioned to measure operational parameters of temperature and pressure. The pressure sensor 204 may be any form of pressure measurement device, such as a capacitive, electromagnetic, piezoelectric, optical, or any other form or pressure sensing device that includes a transducer 212 to output a variable electrical signal indicative of pressure. The temperature sensors 206 and 208 may be any form of temperature measurement device, such as a thermocouple 214 and a transducer 216 to output a variable electric signal indicative of temperature. In other examples, other sensors positioned in the combustion section 130 and/or one or more other sections of the gas turbine engine 100 may be illustrated.

The controller 170 may include a first controller 220 to receive a dynamically changing temperature signal on a first dynamically changing temperature signal line 222 from the first temperature sensor 206 and a dynamically changing pressure signal on the pressure signal line 224 from the pressure sensor 204. In this example configuration, a second controller 228 may receive a second dynamically changing temperature signal on a temperature signal line 230 from the second temperature sensor 208, and the dynamically changing pressure signal on a pressure signal line 232. The first and second controllers 220 and 228 may perform redundant control functions, sequential control functions, parallel control functions, or be represented with a single controller or more than two controllers. In the illustrated example, the first controller 220 may be in a first control lane, and the second controller 228 may redundantly operate in a second control lane in a failover capacity, in an application such as an aircraft control system. The pressure sensor 204 and temperature sensors 206 and 208 may be positioned anywhere in the combustor 202 to obtain a desired respective temperature and pressure and are therefore not limited to the positions shown. The first controller 220 and the second controller 228 may be similar to the controller 170 illustrated in FIG. 1.

Figure 3:
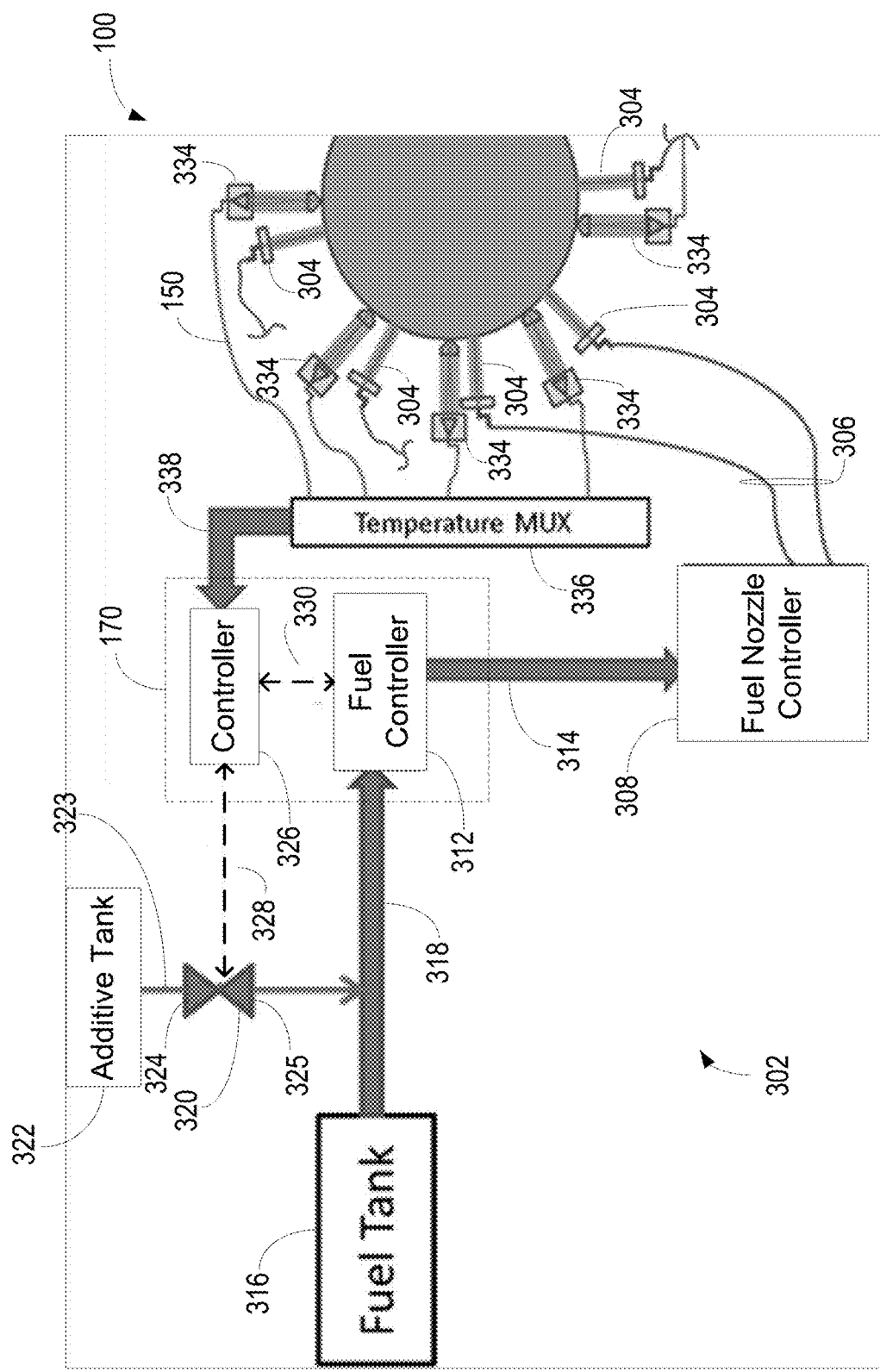
FIG. 3 is a block diagram illustrating an example fuel delivery arrangement of a gas turbine engine.

FIG. 3 is a block diagram illustrating an example fuel delivery arrangement 302 of a gas turbine engine 100. Although illustrated as being associated with a single gas turbine engine 100, in other examples, the fuel delivery arrangement may provide fuel to multiple gas turbine engines 100, and therefore should not be limited by the illustrated example. In addition, the fuel delivery arrangement 300 should not be limited to that illustrated in FIG. 3 since the arrangement may include additional functionality and may be illustrated differently in different examples.

The fuel delivery arrangement 302 includes fuel nozzles 304, which may be positioned in the combustion section 130 (FIG. 1) of the gas turbine 100 to supply fuel to the combustor 202 (FIG. 2). The fuel nozzles 304 may be supplied a variable flow of fuel via fuel supply lines 306. The flow of fuel may be varied by a fuel nozzle controller 308, which may include fuel nozzle controls and injectors to individually supply one or more of the fuel nozzles 304 based on fuel signals provided from a fuel controller 312 over fuel signal lines 314. The flow of fuel may be controlled by the controller 170 via the fuel nozzle controller 308.

In FIG. 3, the controller 170 includes the fuel controller 312, which may receive a supply of fuel, such as natural gas, diesel, gasoline or other form of fossil fuel from a fuel tank 316 via a fuel line 318. A control valve 320 may selectively inject a varying amount of a fuel additive into the fuel flowing in the fuel line 318. The fuel additive may be stored in an additive tank 322. The additive tank 322 is an additive supply reservoir connected by an additive supply line 323 to an inlet 324 of the control valve 320, and an outlet 325 of the control valve 320 connect to the fuel line 318. The fuel additive may be injected into the fuel line 318 at a flow rate dictated by a dynamically variable position of the control valve 320 to dynamically mix with the fuel contained in the fuel line 318. Although only a single control valve 320 and additive tank 322 are illustrated in FIG. 3, any number of control valves 320 and additive tanks 322 may be used to supply fuel additives into the fuel line 318. In FIG. 3, the fuel additive is illustrated as being injected into the fuel line 318. In other examples, the fuel additive may be injected into the fuel in a reservoir, a filter, a bowl, or any other location between the fuel tank 316 and the fuel controller 312. In other words, the fuel additive is dynamically injected into the fuel after the fuel leaves the fuel tank 316 and before the fuel reaches the fuel controller 312 in order to change the combustion characteristics by the combination of the fuel and the fuel additive.

The fuel additive is not fuel, is other than fuel, and is not supplied, provided or derived from the fuel in the fuel tank 316. Instead, the fuel additive may be an alcohol fuel additive, an organic additive and/or a nano-metal additive that changes the caloric content and/or chemical makeup of the fuel provided from the fuel tank 316. Alcohol additives may include, for example, methanol, ethanol and butanol, which may operate as oxidizing additives to enable operation at higher altitudes. Organic fuel additives may include, for example, nitromethane, nitro ethane, 2-methoxy ethyl ether, methyl ester and octyl nitrate. Nano-metal fuel additives may include, for example, manganese, cerium, alumina or silica. Any combination of the fuel additives may be selectively added to the fuel line 318 during operation of the gas turbine engine 100. Thus, the fuel additives may be injected into the fuel line 318 sequentially, or in parallel, or in any combination.

The control valve(s) 320 may be dynamically controlled by the controller 170. In FIG. 3, the controller 170 includes a valve controller 326 which may control the control valve(s) 320 via a valve control line 328 to dynamically modulate the injection of one or more fuel additives into the fuel line 318. The valve controller 326 may also communicate signals indicative of the amount of fuel additive being injected to the fuel controller 312 via a fuel control signal line 330. The valve controller 326 may dynamically control the control valve(s) 320 and communicate with the fuel controller 312 based on one or more operational parameters of the gas turbine engine 100. Operational parameters may include, for example, temperature, pressure, an exhaust gas component or any other parameter indicative of the operation of the gas turbine engine 100. In the example of FIG. 3, sensors in the form of temperature sensors 334 may output electrical signals representative of temperatures in the gas turbine 100, such as in the turbine section 110 (FIG. 1), to a temperature collector 336, such as a temperature multiplexor (MUX). The temperature collector 336 may supply the temperature signals to the valve controller 326 as real-time signals on an operational parameter line 338.

The controller 170 may, be similar to the previously discussed controllers 170, and may, among other things, control the supply of fuel to one or more gas turbine engines 100 using instructions or logic. Control of the supply of fuel by the controller 170 may involve dynamically controlling the addition of fuel additives to the fuel. One or more fuel additives may be controlled by the controller 170 at the gas turbine engine level (e.g. independently and dynamically control fuel additives for a single gas turbine) or at the air frame level (e.g. dynamically control the addition of fuel additives to fuel supplied to multiple gas turbine engines. Although only a single control 170 that includes a single controller 326 and fuel controller 312 is illustrated, in other examples, there may be multiple control lanes, each having a controller 170. In addition, in some examples, the controller 326 and fuel controller 312 may be a single electrical control unit (ECU) or multiple electrical control units (ECU).

The controller 170 may selectively and dynamically inject one or more fuel additives into the fuel delivery system in order to, for example, reduce exhaust gas species from aerospace turbine engine emissions. Alternatively, or in addition, one or more fuel additives may be injected into the fuel line 318 to provide a blended fuel to the gas turbine engine 100 in order to improve operation and performance. Thus, the controller 170 may selectively and dynamically inject fuel additive(s) into the fuel to satisfy two primary objectives: 1) control of exhaust gas emissions; and 2) control of engine performance.

Thus, the system may include at least one sensor positioned to sense an operational parameter of a gas turbine engine 100 and one or more independently operated control valves 320 positioned to supply a fuel additive from a respective additive tank 322 to a fuel line 318. The fuel line 318 may contain fuel from a fuel tank 316 that is supplied to the combustion section of the gas turbine engine 100. The fuel additive may be other than the fuel. A controller 170 may monitor the operational parameter(s) in real time during operation of the gas turbine engine 100 and adjust the control valve(s) 320 to dynamically modulate an amount of fuel additive being supplied in the fuel in accordance with operation of the gas turbine engine.

Figure 4:
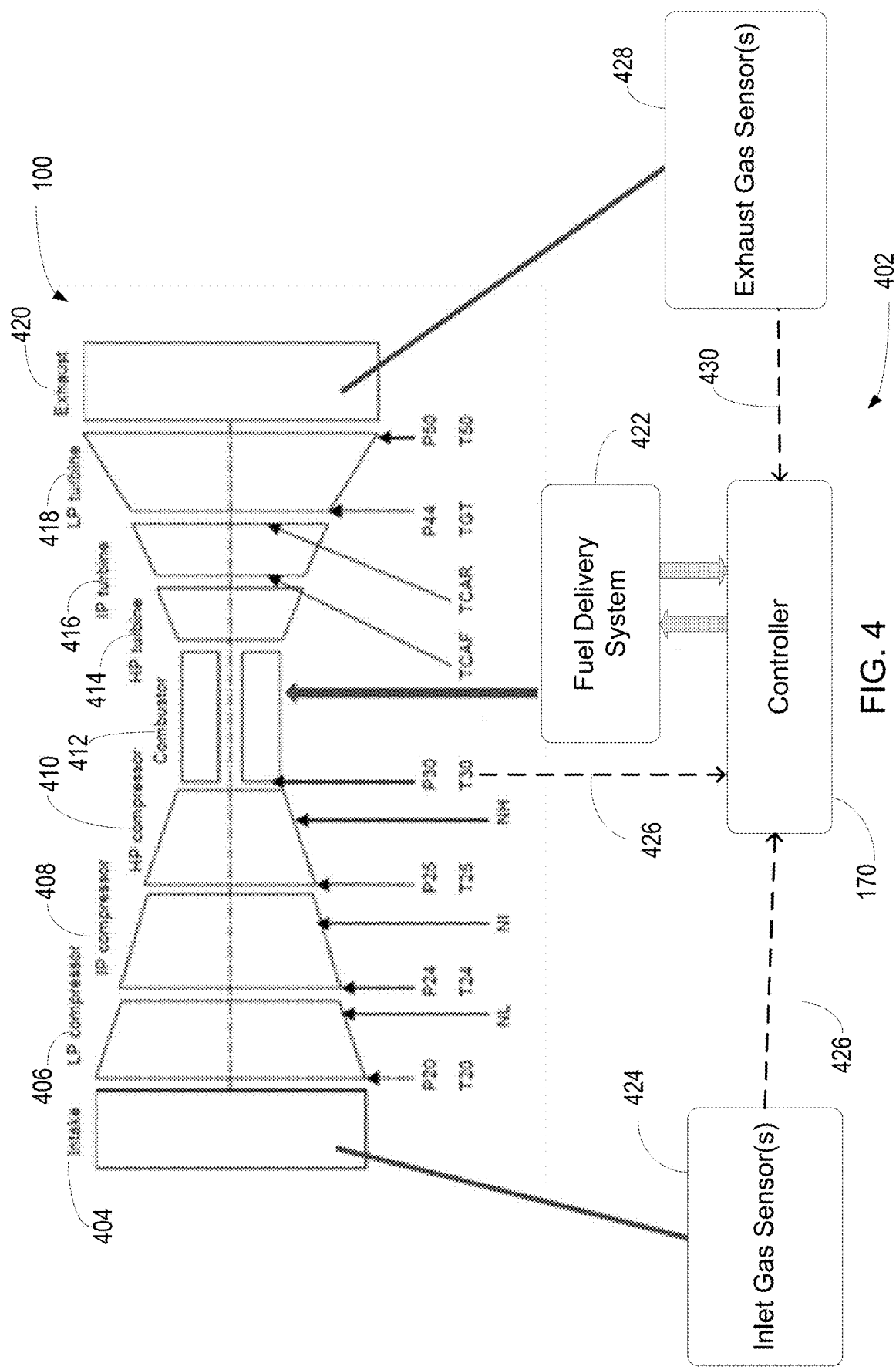
FIG. 4 is a block diagram illustrating an example of a gas turbine engine and fuel control loop for exhaust gas emission control.

FIG. 4 is a block diagram illustrating an example of a gas turbine engine 100 and fuel control loop 402 for exhaust gas emission control. In the example of FIG. 4, operational parameters are shown as being available from different sensors for monitoring in different areas of the gas turbine engine 100. The gas turbine engine 100 includes an intake section 404, a compressor section that includes a low pressure(LP) compressor 406 operational at a low pressure compressor speed (NL), which may be monitored by a pressure sensor (P20) and a temperature sensor (T20). The compressor section may also include an intermediate pressure(IP) compressor 406 operational at an intermediate pressure compressor speed (NI), which may be monitored by a pressure sensor (P24) and a temperature sensor (T24) and a high pressure(HP) compressor 410 operational at a high pressure compressor speed (NH), which may monitored by a pressure sensor (P25) and a temperature sensor (T25). In other examples, any number of other pressure and temperature sensors may be present in the compressor section of the gas turbine engine 100.

A combustor 412 included in combustion section of the gas turbine engine 100 may be monitored by a pressure sensor (P30) and a temperature sensor (T30). The gas turbine engine 100 may also include a turbine section that includes an HP turbine 414, an IP turbine 416 where turbine cooling air front (TCAF) or turbine cooling air rear (TCAR) may be monitored as operational parameters, and a low pressure (LP) turbine 418, which may be monitored with a pressure sensor (P44) and a turbine gas temperature sensor (TGT). The gas turbine engine 100 may also include an exhaust section 420 which may be monitored by a pressure sensor (P50) and a temperature sensor (T50). In other examples, any number of other pressure and temperature sensors may be present in the combustor, the turbine section, or the exhaust section of the gas turbine engine 100. In addition, in other examples, additional or fewer operational parameters may be available from sensors.

The fuel control loop 402 may include the controller 170 and a fuel delivery system 422. The fuel delivery system 422 may include the functionality described with reference to FIG. 3, such as the fuel tank 316, fuel additive(s) tank 322, control valves 320, fuel nozzle controller 308, fuel nozzles, 304, and the like. The controller 170 may include one or more electronic control units (ECU) operating in one or more control lanes, such as a first control lane and a second redundantly operating control lane. The controller 170 may receive operational parameters on a parameter line 426. In FIG. 4, the combustor pressure from pressure sensor P30 and combustor temperature from temperature sensor T30 are received by the controller 170. In other examples, any number of different operational parameters, such as temperature of the LP turbine 418 provided by temperature sensor TGT and the pressure of the combustor 412 provided by pressure sensor P30 may be received as operational parameters.

In addition, the controller 170 may receive operational parameters of an inlet gas measurement, such as an O2 measurement, temperature measurement or humidity measurement, from an inlet gas sensor(s) 424 on an inlet gas signal line 426. An outlet gas sensor 428 may provide the controller with operational parameters of an exhaust gas measurement such as O2, CO, CO2, NOx, or particulate on an outlet gas signal line 430. The real-time injection of one or more fuel additives such as an alcohol fuel additive, an organic fuel additive, and/or a nano-metal fuel additive may be supplemented into the fuel delivery system 422 to control exhaust gas emissions. For example, exhaust gases such as CO, $CO_2$, $NO_x$ levels, Total Hydrocarbon Content (THC) and other types of combustion particulates in gas turbine engine exhaust may be controlled. In addition to controlling exhaust gas emissions, the controller 170 may dynamically inject fuel additives into the fuel delivered to one or more gas turbine engines 100 to optimize operation and performance of the gas turbine engine 100. For example, fuel additives may be selectively and dynamically injected using the fuel delivery system 422 to avoid undesirable operational conditions, such as high temperatures or pressures, that may, for example, result in accelerated maintenance activities, decreased efficiency and/or detrimentally impact equipment longevity.

The controller 170 may balance the twin goals of emissions control and operational performance by dynamically injecting one or more fuel additives under different operating conditions. For example, during intermittent heavy loading, such as during takeoff or ascent of an airplane, the controller 170 may dynamically inject one or more fuel additives to increase engine torque, whereas during relatively stable loading, such as when an airplane reaches cruising altitude, the controller 170 may inject one or more fuel additives into the fuel to minimize exhaust gas parameters, perhaps at the "expense" of engine performance. In another example, the controller 170 may inject different fuel additives in different time periods, such as during descent of an airplane, in accordance with different operational demands, such as engine load, and/or environmental conditions, such as, changes in temperature or absolute pressure. In addition, or alternatively, combinations of fuel additives may be selectively and dynamically injected into the fuel, to, for example, achieve optimal engine performance, while also minimizing exhaust gas parameters.

Monitoring of operational parameters of the gas turbine engine 100 to perform injection of the fuel additive(s) may involve sensors strategically located in any of the intake 404, the LP compressor 406, the IP compressor 408, the HP compressor 410, the combustor 412, the HP turbine 414, the IP turbine 416 the LP turbine 418 and/or the exhaust 420. The sensors may monitor operational parameters such as, for example, temperatures, pressures, exhaust gas species and/or exhaust gas particulate. Output signals indicative of the measured operational parameters may be provided as variable electrical input signals to the controller 170. In an example, the controller 170 may perform real time monitoring of exhaust gas species from an outlet gas sensor 428 positioned in the engine exhaust section 420, $O_2$ levels at the engine inlet sensed by an inlet gas sensor 424, such as an O2 sensor, positioned in the intake section 404, and/or temperature sensor(s) and/or pressure sensor(s) positioned in the combustion section or the turbine section. In addition, the controller 170 may perform real time monitoring of operational parameters of the fuel delivery system 422 of the gas turbine engine 100, such as fuel flow amounts, injector settings, and the like. Using the operational parameters, the controller 170 may establish in real-time a changing quantity of fuel additive to be dynamically added to the fuel to, for example, control the system specific fuel consumption (SFC) and regulate the exhaust gases from the gas turbine engine 100.

With this new fuel delivery scheme, and the inclusion of measurement and control techniques around the gas turbine engine 100, operational parameters such as the oxygen levels at the engine inlet and in the fuel system may be measured. In addition, operational parameters such as the exhaust gas species may be measured and logged in real time. These operational parameters may be fed back to one or more control loops of the controller 170, such as a control loop to change the air to fuel ratio. Changes in the air to fuel ratio may control the engine temperatures and pressures thereby adjusting engine performance, maintenance requirements and longevity. The air to fuel ratio may be changed by the controller 170 by dynamically regulating the delivery of the fuel additives necessary for an optimum clean burning aero engine system with reduced levels of emissions. Thus, operation of the system may result in an optimized engine control system, such as a lean burn fuel system, to dynamically meet exhaust emission targets and provide improved specific fuel consumption (SFC) for the engine platform.

In an example, measurements at the inlet and exhaust by the inlet gas sensor 424 and the exhaust gas sensor 428, provide the concentration of $O_2$ at the engine inlet and in the fuel system as operational parameter inputs into the control system in real time, along with the engine temperatures and pressures measurements in the combustor. The controller 170 may dynamically modulate the amount of the fuel additive being supplied using these operational parameters. Dynamic regulation of delivery of the fuel additive by the controller 170 may, for example, dynamically control a level of an exhaust gas component sensed by the exhaust gas sensor 428 or temperatures or pressures sensed by respective sensors. Where multiple operational parameters are measured, the measurements of the operational parameters may be weighted by the controller 170 in the control loop(s) in accordance with the operational conditions of the gas turbine engine. Thus, for example, exhaust gas condition measurements may be more heavily weighted when emission controls have a higher priority, whereas pressure and temperate measurements may be more heavily weighted when engine performance has higher priority. These input and control parameters associated with the inlet and exhaust output gases, and engine performance may be continuously monitored and processed in the control loop(s) to establish the quantity of fuel additive(s) required to optimize performance, the combustion efficiency and/or reduce the emission of greenhouse gases.

For example, an alcohol fuel additive such as Butanol may be added by the fuel delivery system 422 to control levels of the exhaust gases. Alcoholic fuels such as Butanol provide the capability for being used as oxygenated fuel additives. These fuel additives can be readily blended with fossil-based fuels such as JET A to improve the octane number of the resulting fuel mixture. Butanol may be added to kerosene and diesel types of fuel with no other additives due to Butanol's high cetane number and higher molecular weight of formulations such as n-butanol. Furthermore, it is noted that blending of such fuel additives with fuel should not result in a two-phase composition over the operating temperature range. Also, the addition of oxidizing additives may be an enabler for operation at higher altitudes Based on the control algorithms, the controller 170 may adjust the air to fuel ratio and blend into the fuel one or more fuel additive(s) by dynamically controlling the quantity of fuel additive being injected into the fuel with the fuel delivery system 422 as operational conditions of the gas turbine engine 100 change. The fuel additive may be injected to, for example, optimize the engine temperatures and pressures in the combustor 412 to eliminate unwanted combustion by-products. The real time inclusion of fuel additives in the combustor 412 may adjust the combustion temperature and pressures in the combustor 412, and thereby reduce exhaust gases. Such reductions in exhaust gases may be beneficial to reduce air contaminants, which may be required compliance with emissions requirements, such as the Clean Sky 2 requirements. These new fuel delivery schemes, sensor locations and control algorithms result in optimum combustion and control of the exhaust gases. The control logic within the control loop(s) may be digitized to allow for optimum real time communication and control functionality with controller 170, such as an EEC or FADEC, for real time engine control. In another example, the control loop(s) may be operated around Model Based Engine Control established by ground based testing.

Communication of the operational parameters from the sensors and control outputs by the controller 170 and the fuel delivery system 422 may be by wiring harness, fiber optic interconnections, wireless communications, or any other mechanism for transmission of data. Protocols for the communications may include analog or digital signals processed to support ETHERNET, CAN, RS232, RS485 or other types of communication protocols. The controller 170 may be a centralized controller, or may be included in a distributed control network.

This technique provides an improvement in engine operation, where the peak engine performance can be attained via the accurate and instantaneous measurement of exhaust gases and introduction of the requisite additives to the fuel delivery system. This control scheme allows for inherent improvements in engine maintenance, performance on wing, improved SFC and reduction in exhaust gases.

Dynamic regulation by the controller 170 of the amount of fuel additive(s) being injected into the fuel line may be based on a set point. Alternatively, dynamic regulation of the amount of fuel additive(s) being injected into the fuel may be based on a model parameter from a real-time gas turbine engine model. In an example, measurement of operational parameters such as $O_2$, CO, $CO_2$, $NO_x$ levels at the exhaust section 420 may be used in conjunction with real-time or model-based control of the engine control and measurement of fuel additives into the fuel delivery system 422. Either real time or model based control methods may be used by the controller 170. Using model based controls, the controller 170 may provide inferential data about system operation, such as, for example, fuel flow rate, engine thrust, and the like.

Figure 5:
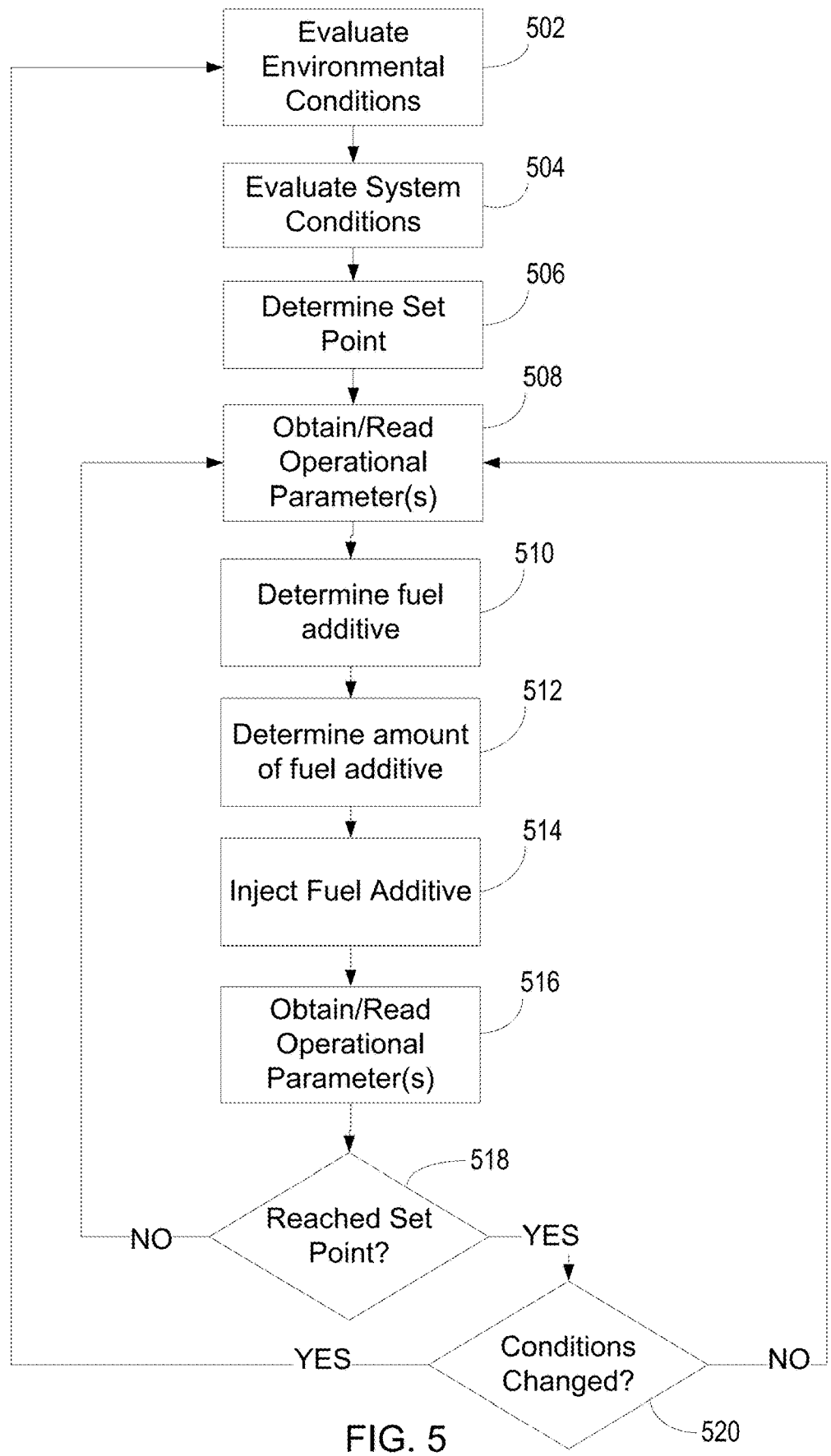
FIG. 5 is a flow diagram illustrating an example operation of gas turbine engine fuel additive control system.

FIG. 5 is a flow diagram illustrating example operation of gas turbine engine fuel additive control system. In FIG. 5, the system may first perform an evaluation of environmental conditions. (502) Environmental conditions may include, for example, ambient temperature, pressure, altitude, mach speed, oxygen levels, humidity and other variable parameters indicative of the environment in which the gas turbine engine is operating. The system may also perform an evaluation of system conditions. (504) System conditions may be evaluated using operational parameters such as, for example, variable geometry (such as vane tip clearance control), speed, percent of full load, engine temperatures and pressures, exhaust gas composition, and the like.

The system may determine a set point based on the current environmental conditions and the current system conditions. (506) In this regard, the system may use the current environment and current system conditions to ascertain the operational condition of the gas turbine engine. Example operational conditions for an aircraft may be ascending, descending, cruising at altitude or idling. The set point may be, for example, an optimal level of one or more exhaust gas components such as NOx or C02. In other examples, the set point may be, for example, a temperature or a pressure that prolongs maintenance cycles. Determination of the set point may be based on, for example, operating conditions of the gas turbine engine. For example, in an aircraft application whether the aircraft is ascending, descending or at cruising altitude. The system may obtain and read the operational parameter(s) to which the set point applies. (508)

The operational parameters may be, for example, exhaust gas conditions from one or more sensors. Exhaust gas conditions may be CO, $CO_2$, $NO_x$ levels, Total Hydrocarbon Content (THC) and other types of combustion particulates in gas turbine engine exhaust. In another example, the operational parameters(s) read may be temperature and/or pressure. In still another example, the operational parameter(s) may be both exhaust gas conditions and temperature and/or pressure. Where the operational parameter(s) being read are multiple different parameters, such as both exhaust gas conditions and temperature and/or pressure, the system may apply a weighting or other prioritizing mechanism to the operational parameters being read.

Based on operational conditions the system may determine one or more fuel additives to inject into the fuel. (510) In addition, the system may determine an amount or volume of fuel additive(s) to dynamically inject. (512) The amount of fuel additive to dynamically inject may be based on a flow rate of the fuel, the desired amount of change in current exhaust gas conditions and/or the operational parameters in order to change the combustion properties or qualities in the combination of the fuel and the fuel additives in real-time. The system may inject the fuel additive into the fuel line at a dynamically adjustable rate that achieves the desired amount. (514)

The system may obtain/read at least some of the operational parameter(s) while the fuel additive is being dynamically injected. (516) The system may review the operational parameter(s) of interest in real-time as the fuel with the fuel additive is being supplied to the fuel nozzles and being burned in the combustor to determine if the set point has been reached. (518) If set point has not been reached, the system returns to (508) to again obtain/read the operational parameter(s). If the set point has been reached, the system determines if the conditions and/or the environmental conditions have changed. (520) If the system and/or environmental conditions have not changed, then the system returns to (508) to again obtain/read the operational parameter(s). If the conditions have changed, the system returns to (502) to evaluate conditions.

Figure 6:
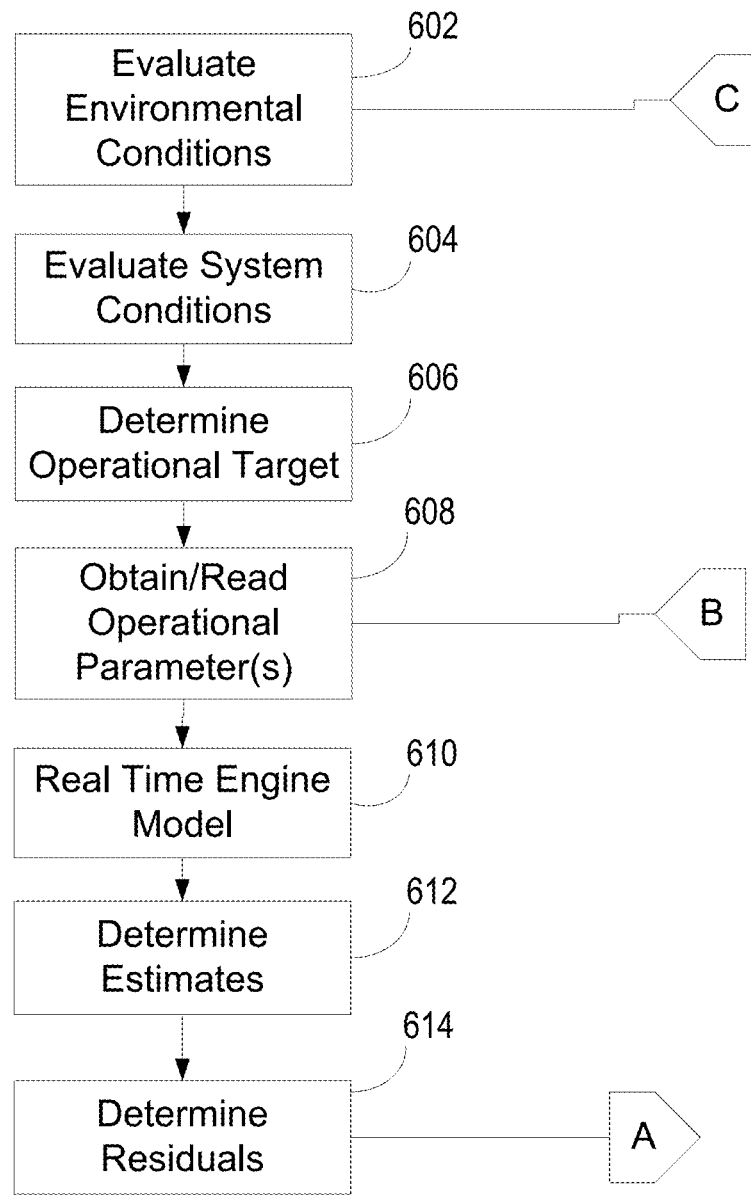
FIG. 6 is a flow diagram illustrating another example operation of gas turbine engine fuel additive control system.

FIG. 6 is a flow diagram illustrating another example operation of gas turbine engine fuel additive control system. In FIG. 6, the system may perform an evaluation of the environmental conditions (602), and the system conditions. (604) The system may determine a operational target(s) based on the current environmental conditions and the current system conditions. (606) The operational target(s) may be, for example, an optimal NOx or CO2 value of the exhaust gases, or an operational temperature and/or pressure, or a combination of a number of different variables, such as a threshold NOx or CO2 value of the exhaust gases, and a threshold temperature or pressure. The system may obtain and read the operational parameter(s) related to the operational target(s). (608)

The system may input the environmental conditions, the system conditions and the operational parameters to a real-time engine model. (610) The model may be executed by the system to determine estimates of the currently sensed operational parameters (sensed variables) that will meet the operational target(s). (612) The real-time engine model may perform a real-time dynamic simulation of operation of the gas turbine engine in the current environment to estimate operational parameters that will meet the operational target(s). Alternatively, simulations may be performed previously or in non-real time such that the real-time engine model can provide real time estimates of the operational parameters that will achieve the operational target(s).

The system may determine differences between the estimated operational parameters and the actual measured operational parameters (sensed variables). (614) The difference between the model based estimate and the currently sensed operational parameters (sensed variables) may be used to determine a residual or error based estimate that is used as a model control parameter to drive toward a zero value for optimized control.

Figure 7:
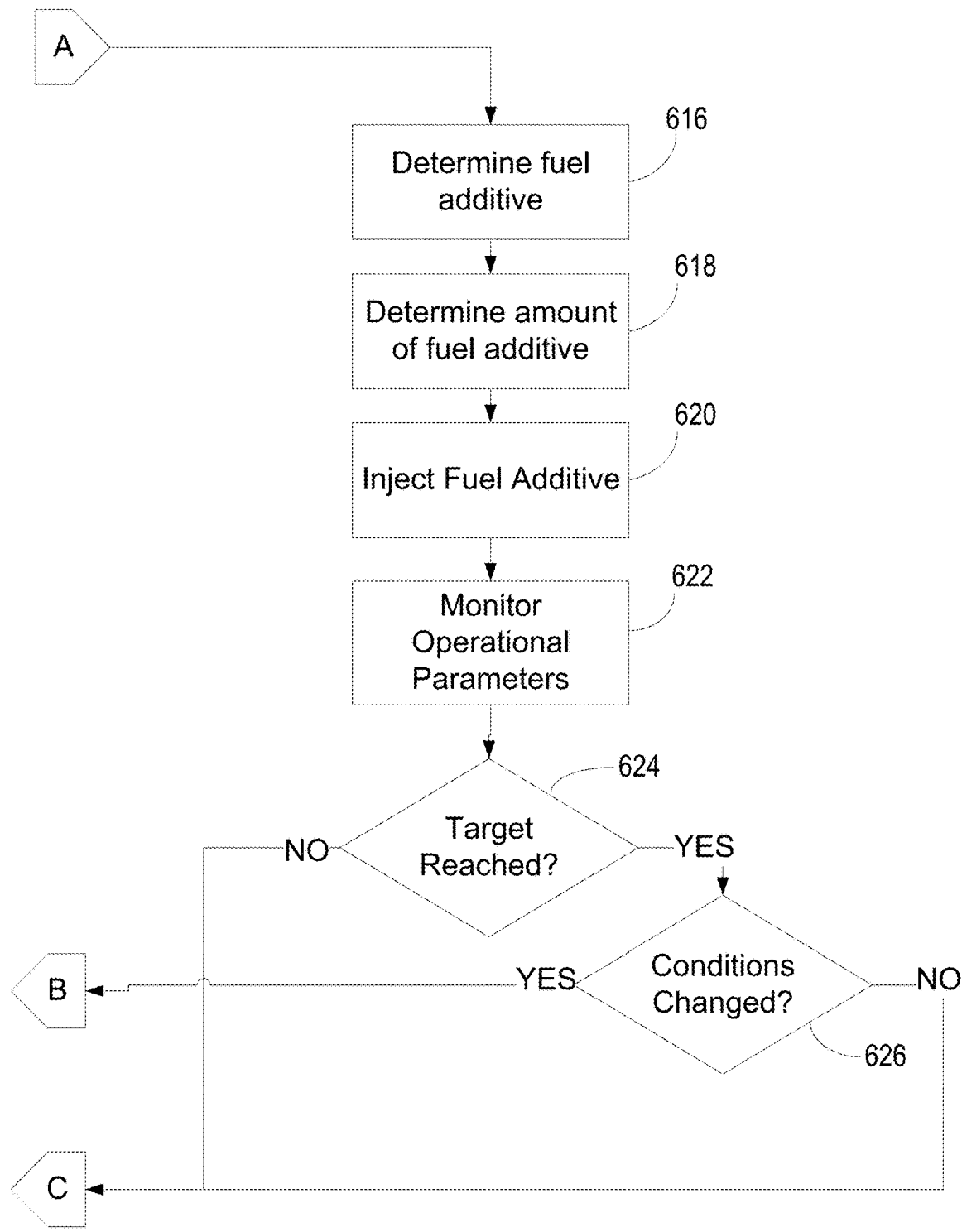
FIG. 7 is part of the flow diagram example of FIG. 6.

Referring now to FIG. 7, based on model control parameter the system may determine one or more fuel additives to inject into the fuel. (616) In addition, the system may determine an amount or volume of fuel additive(s) to dynamically inject. (618) The amount of fuel additive to dynamically inject may be based on a flow rate of the fuel and the control parameter in order to change the combustion properties or qualities in the combination of the fuel and the fuel additives in real-time. The system may inject the fuel additive into the fuel line at a dynamically adjustable rate that achieves the desired amount. (620) The system may obtain/read at least some of the operational parameter(s) while the fuel additive is being dynamically injected. (622) The system may monitor if the operational target(s) are being achieved in real-time as the fuel with the fuel additive is being supplied to the fuel nozzles and being burned in the combustor. (624) If operational target(s) have not been reached, the system returns to (608) (FIG. 6) to again obtain/read the operational parameter(s). If the operational target(s) has been reached, the system determines if the conditions and/or the environmental conditions have changed. (626) If the system and/or environmental conditions have not changed, then the system returns to (608) (FIG. 6) to again obtain/read the operational parameter(s). If the conditions have changed, the system returns to (602) (FIG. 6) to evaluate conditions. Thus, the system may, for example, dynamically model a projected operational profile of the gas turbine engine, and dynamically adjust the injection of the fuel additive in accordance with the predicted operational profile to reduce exhaust gases of the gas turbine engine.

The system 100 may be implemented with additional, different, or fewer components. For example, the controller 170 may be any number of distributed controllers, a single central controller, or a combination of logic circuitry and one or more controller. In another example, the gas turbine engine fuel additive control system may be used in the fuel supply of only one gas turbine engines, or may be used in the fuel supply that is common to multiple gas turbine engines.

Any controller described herein may be circuitry which is hardware or a combination of hardware and software. For example, circuitry may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each circuitry may include memory hardware, such as a portion of a memory, for example, that comprises instructions executable with a processor to implement one or more of the features of the circuitry. When any one of the circuitry includes the portion of the memory that comprises instructions executable with a processor, the circuitry may or may not include the processor. In some examples, each circuitry may just be the portion of the memory that comprises instructions executable with a processor to implement the features of the corresponding circuitry without the circuitry including any other hardware. Because each circuitry includes at least some hardware even when the included hardware comprises software, each circuitry may be interchangeably referred to as a hardware module.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
a sensor positioned to sense an operational parameter of a gas turbine engine, the gas turbine engine comprising a compressor section, a combustion section, and a turbine section;
a control valve positioned to supply a fuel additive to a fuel line, the fuel line containing fuel for supply to the combustion section of the gas turbine engine, and the fuel additive being other than the fuel; and a controller configured to monitor the operational parameter in real time during operation of the gas turbine engine and adjust the control valve to dynamically modulate an amount of the fuel additive being supplied in the fuel in accordance with operation of the gas turbine engine.

2. The system of aspect 1, wherein the fuel additive comprises at least one of an alcohol additive, an organic additive or a nano-metal additive.

3. The system of aspect 2, wherein the alcohol additive comprises at least one of methanol, ethanol or butanol.

4. The system of aspect 2 or 3, wherein the organic additive comprises at least one of nitromethane; nitroethane, 2-methoxy ethyl ether, methyl ester, or octyl nitrate.

5. The system of any of aspects 2-4, wherein the nano-metal additive comprises at least one of manganese, cerium, alumina or silica.

6. The system as in any of aspects 1-5, wherein the sensor comprises a temperature sensor and a pressure sensor positioned proximate at least one of the combustion section or the turbine section of the gas turbine engine.

7. The system of aspect 6, wherein the sensor further comprises an exhaust gas component sensor, and the controller is configured to dynamically modulate the amount of the fuel additive being supplied to regulate delivery of the fuel additive so that a level of an exhaust gas component sensed by the exhaust gas component sensor is dynamically controlled.

8. The system as in any of aspects 1-7, wherein the controller is configured to dynamically regulate an amount of fuel additive being supplied in the fuel based on a set point.

9. The system as in any of aspects 1-8, wherein the controller is configured to dynamically regulate an amount of fuel additive being supplied in the fuel based on a model control parameter from a real time gas turbine engine model.

10. The system as in any of aspects 1-9, further comprising an additive supply reservoir connected by an additive supply line to an inlet of the control valve, and an outlet of the control valve connect to the fuel line, the fuel additive being injected into the fuel line at a flow rate dictated by a dynamically variable position of the control valve to dynamically mix with the fuel contained in the fuel line.

11. A method comprising:
sensing an operational parameter of a gas turbine engine;
monitoring the sensed operational parameter with a controller;
supplying fuel to a combustor of the gas turbine engine; and
dynamically injecting a varying amount of a fuel additive into the fuel in response to changes in the operational parameter, the fuel additive being other than the fuel.

12. The method of aspect 11, wherein supplying fuel comprises supplying the fuel containing the fuel additive to a single gas turbine engine.

13. The method of aspect 11 or 12, wherein supplying fuel comprises supplying the fuel containing the fuel additive in parallel to a plurality of gas turbine engines.

14. The method as in any of aspects 11-13, wherein sensing the operational parameter comprises sensing a pressure in a combustion section of the gas turbine engine and sensing a temperature in a turbine section of the gas turbine engine.

15. The method of aspect 14, wherein sensing the operational parameter comprises sensing a level of a gas component in exhaust gases of the gas turbine engine, and dynamically adjusting a volume of the fuel additive being injected to change the level of the gas component being sensed.

16. The method as in any of aspects 11-15, wherein sensing the operational parameter comprises sensing particulate in exhaust gases of the gas turbine engine.

17. The method as in any of aspects 11-16, further comprising dynamically modeling a projected operational profile of the gas turbine engine, and dynamically adjusting the injecting of the fuel additive in accordance with the projected operational profile to reduce exhaust gases of the gas turbine engine.

18. The method as in any of aspects 11-17, further comprising evaluating environmental conditions, and dynamically adjusting the varying amount of the fuel additive being injected into the fuel in accordance with changes in the environmental conditions.

19. The method as in any of aspects 11-18, wherein the fuel additive comprises a plurality of different fuel additives and dynamically injecting comprises injecting a first volume of a first fuel additive during a first operational condition of the gas turbine engine, and injecting a second volume of a second fuel additive during a second operational condition of the gas turbine engine.

20. A method comprising:
receiving an environmental condition and a system condition of a gas turbine engine;
receiving a sensed operational parameter from a sensor included in the gas turbine engine;
adjusting a control valve included in the gas turbine engine to inject a fuel additive into a supply of fuel flowing to fuel controller included in the gas turbine engine;
mixing the fuel and the fuel additive; and supplying the supply of fuel mixed with the fuel additive to fuel controller included in the gas turbine engine.

What is claimed is:
1. A system comprising:
a plurality of sensors positioned to sense operational parameters of a gas turbine engine, the gas turbine engine comprising a compressor section, a combustion section, and a turbine section, and the sensors comprising a temperature sensor, a pressure sensor or a gas sensor configured to sense the operational parameters in the compressor section, the combustion section or the turbine section of the gas turbine engine;
a control valve positioned to modulate a supply of a plurality of fuel additives to a fuel line, the fuel line containing fuel for supply to the combustion section of the gas turbine engine, and the fuel additives being other than the fuel; and
a controller circuitry configured to evaluate system conditions from the operational parameters of the gas turbine engine and evaluate environmental conditions of an environment in which the gas turbine engine is operating to ascertain an operational condition of the gas turbine engine,
wherein the controller circuitry is further configured to weight the operational parameters in real time according to the operational condition ascertained in real time,
wherein the controller circuitry is further configured to dynamically control, with the control valve, an amount of each of the fuel additives being supplied in the fuel in response to real-time changes in the weighted operational parameters.

2. The system of claim 1, wherein the fuel additives comprise at least one of an alcohol additive, an organic additive or a nano-metal additive.

3. The system of claim 2, wherein the alcohol additive comprises at least one of methanol, ethanol or butanol.

4. The system of claim 2, wherein the organic additive comprises at least one of nitromethane; nitroethane, 2-methoxy ethyl ether, methyl ester, or octyl nitrate.

5. The system of claim 2, wherein the nano-metal additive comprises at least one of manganese, cerium, alumina or silica.

6. The system of claim 1, wherein the gas sensor further comprises an exhaust gas component sensor, and the controller circuitry is configured to dynamically control, with the control valve, the amount of each of the fuel additives being supplied to regulate delivery of the fuel additives so that a level of an exhaust gas component sensed by the exhaust gas component sensor is dynamically controlled.

7. The system of claim 1, wherein the controller circuitry is configured to dynamically control, with the control valve, an amount of each of the fuel additives being supplied in the fuel based on a set point.

8. The system of claim 1, wherein the controller circuitry is configured to dynamically control, with the control valve, an amount of each of the fuel additives being supplied in the fuel based on a model control parameter from a real time gas turbine engine model.

9. The system of claim 1, further comprising an additive supply reservoir connected by an additive supply line to an inlet of the control valve, and an outlet of the control valve connect to the fuel line, at least one of the fuel additives being injected into the fuel line at a flow rate dictated by a dynamically variable position of the control valve to dynamically mix with the fuel contained in the fuel line.

10. The system of claim 1, wherein the controller circuitry is further configured to inject a first fuel additive to increase torque of the gas turbine engine due to the operational condition being indicative of intermittent variable loading of the gas turbine engine, and the controller circuitry is further configured to inject a second fuel additive to minimize exhaust gas of the gas turbine engine in response to the operational condition being indicative of non-variable loading of the gas turbine engine.

11. The system of claim 1, wherein the operational parameters include variable geometry, speed, percent of full load, engine temperatures and pressures, or exhaust gas composition.

12. The system of claim 1, wherein the environmental conditions include an ambient temperature, pressure, altitude, Mach speed, oxygen levels, or humidity of an environment in which the gas turbine engine is operating.

13. The system of claim 1, wherein the operational condition for the gas turbine engine comprises ascending, descending, cruising at altitude or idling.

14. A method comprising:
sensing an environmental condition and an operational parameter of a gas turbine engine, the environmental condition indicative of an environment in which the gas turbine engine is operating, the operational parameter being a temperature, a pressure, or a gas component used to determine emissions of the gas turbine engine;
monitoring the sensed environmental condition and the sensed operational parameter with a controller circuitry to ascertain an operational condition of the gas turbine engine;
inputting the sensed environmental condition and the sensed operational parameter into a real-time engine model being executed by the controller circuitry;
performing, with the real-time engine model, a real-time dynamic simulation of the sensed environmental condition and the sensed operational parameter within the real-time engine model to estimate an optimal operational parameter to meet a target operational condition;
supplying fuel to a combustor of the gas turbine engine; and
dynamically injecting a varying amount of each of a plurality of fuel additives into the fuel in response to a difference between the optimal operational parameter and the sensed operational parameter to change from the ascertained operational condition to the target operational condition of the gas turbine engine, wherein the fuel additive is other than the fuel.

15. The method of claim 14, wherein supplying fuel comprises supplying the fuel containing the fuel additives to a single gas turbine engine.

16. The method of claim 14, wherein supplying fuel comprises supplying the fuel containing the fuel additives in parallel to a plurality of gas turbine engines.

17. The method of claim 14, wherein sensing the operational parameter comprises sensing the pressure in a combustion section of the gas turbine engine and sensing the temperature in a turbine section of the gas turbine engine.

18. The method of claim 17, wherein sensing the operational parameter comprises sensing a level of the gas component in exhaust gases of the gas turbine engine, and dynamically adjusting a volume of the fuel additives being injected to change the level of the gas component being sensed.

19. The method of claim 14, wherein sensing the operational parameter comprises sensing particulate in exhaust gases of the gas turbine engine.

20. The method of claim 14, further comprising evaluating environmental conditions, and dynamically adjusting the varying amount of the fuel additive being injected into the fuel in accordance with changes in the environmental conditions.

21. A method comprising:
sensing a plurality of operational parameters of a gas turbine engine;
monitoring the sensed operational parameters with a controller circuitry;
evaluating current environmental conditions with the controller circuitry;
evaluating, with the controller circuitry, a current system condition of the gas turbine engine based on the operational parameters;
ascertaining in-real time, an operational condition of the gas turbine engine based on the evaluation of the current environmental conditions and the evaluation of the current system condition;
weighting the sensed operational parameters based on the operational condition of the gas turbine engine;
supplying fuel to a combustor of the gas turbine engine; and
dynamically injecting a varying amount of each of a plurality of fuel additives into the fuel in response to the weighted sensed operational parameters, the fuel additives being other than the fuel, wherein dynamically injecting comprises injecting a first volume of a first fuel additive during a first operational condition of the gas turbine engine, and injecting a second volume of a second fuel additive during a second operational condition of the gas turbine engine.

* * * * *